Feb. 15, 1938.                R. W. LEUTWILER ET AL                 2,108,601
                                  STEAM HEATING
                    Filed April 4, 1936            4 Sheets-Sheet 2

Inventors
Richard W. Leutwiler
William Eichholz
by Kummler, Kummler & Woodworth
their Attys.

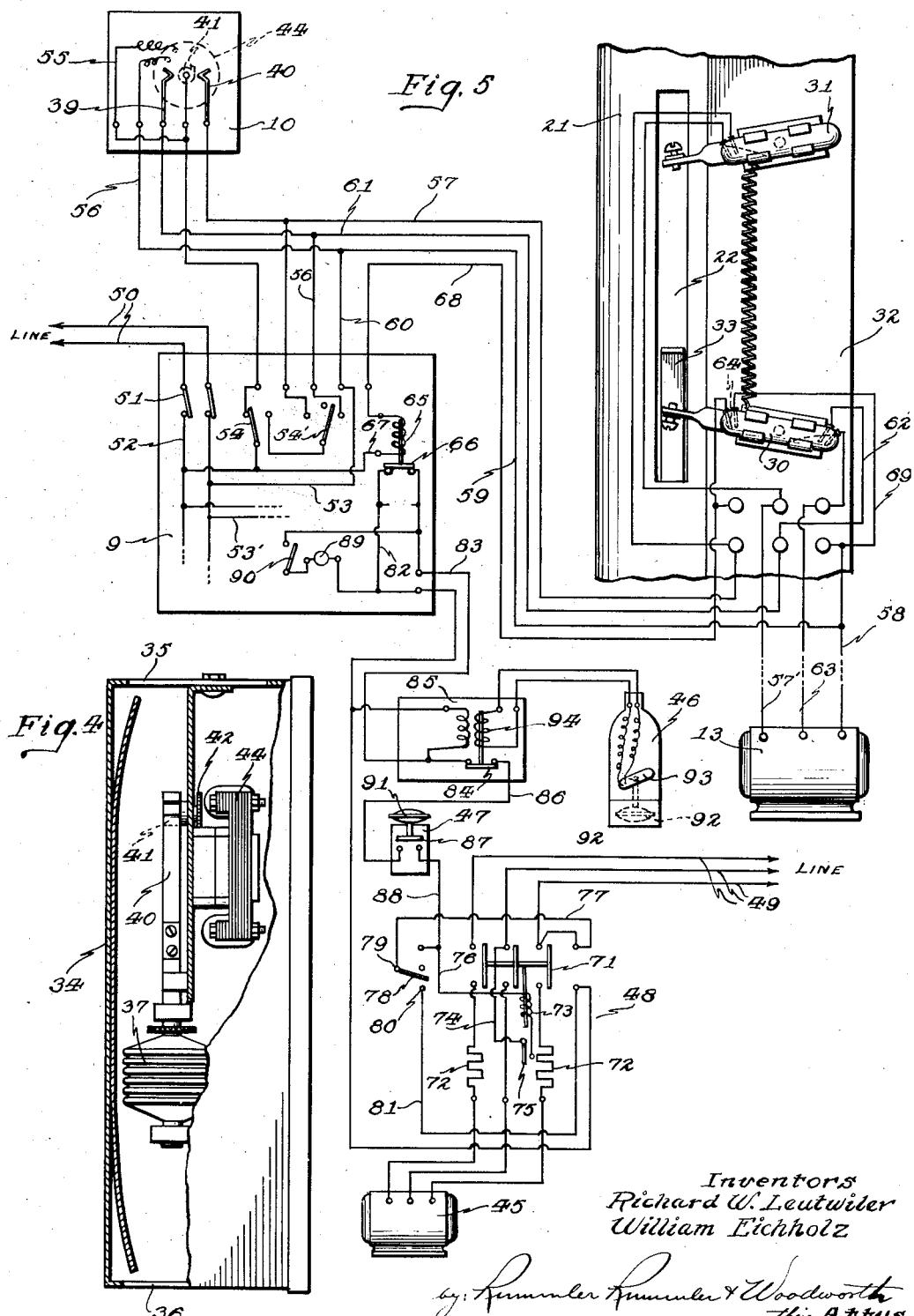

Patented Feb. 15, 1938

2,108,601

UNITED STATES PATENT OFFICE 2,108,601

STEAM HEATING

Richard W. Leutwiler, Chicago, and William Eichholz, Cicero, Ill., assignors to Illinois Engineering Company, Chicago, Ill., a corporation of Illinois Application April 4, 1936, Serial No. 72,692

9 Claims. (Cl. 237—9)

This invention relates to steam heating systems having one or more zones and particularly to a combination of control devices whereby the heat delivery to the separate zones may be closely regulated according to differing requirements. The regulation is automatic with provision for manual control from a central switchboard independently of the automatic operation. The automatic regulation controls the mean effective temperature of the heating medium, as delivered to the zones, proportionately to the heat losses from the building and independently of the supply pressure.

One of the main purposes of the invention is to improve steam heating systems of the class mentioned, whereby the steam delivery to the different heated zones is caused to change in rate very closely to that required for maintaining uniform temperatures, however abrupt or gradual are the changes in conditions of heat losses from the building or buildings serviced.

A further purpose of the invention is to provide for an improved coordination between regulating means for controlling steam delivery to various zones and the operation of the vacuum pump in the return main, whereby the pump operates when the control devices are positioned for an inflow of steam in any one or more of the heated zones and also according to the relation of pressure and temperature conditions in the return main, to insure that the pump will produce the greatest vacuum differential possible without causing re-evaporation of condensate.

Another object of the invention is to provide for an improved operation resulting from the coaction of automatic regulating valves, designed for receiving successive slight increments of movement in an opening or closing direction, with thermostatic controls therefor arranged for passing successive electric impulses to the regulators which are electrically driven.

The objects of the invention are accomplished by means of a steam heating system as illustrated in the drawings, wherein—

Fig. 4 is a side view of the thermostat with the casing partly broken away and in section.

Fig. 5 is a wiring diagram showing electrical connections between the switchboard, thermostat and the motors for a pressure regulator, the vacuum pump, and control devices therefor.

Distinguishing features of the heating system herein disclosed are the use of electrically driven regulating valves for the different heated zones in combination with separate electrically driven thermostatic devices which are wired to the regulators in order to cause separate slight successive opening or closing movements thereof according to changing heat requirements and the use, also in the general combination, of control devices for the vacuum pump dependent for operation upon the setting of the automatic regulating devices for steam delivery to the different zones and temperature and fluid pressure conditions existing in the return main.

Figure 1:
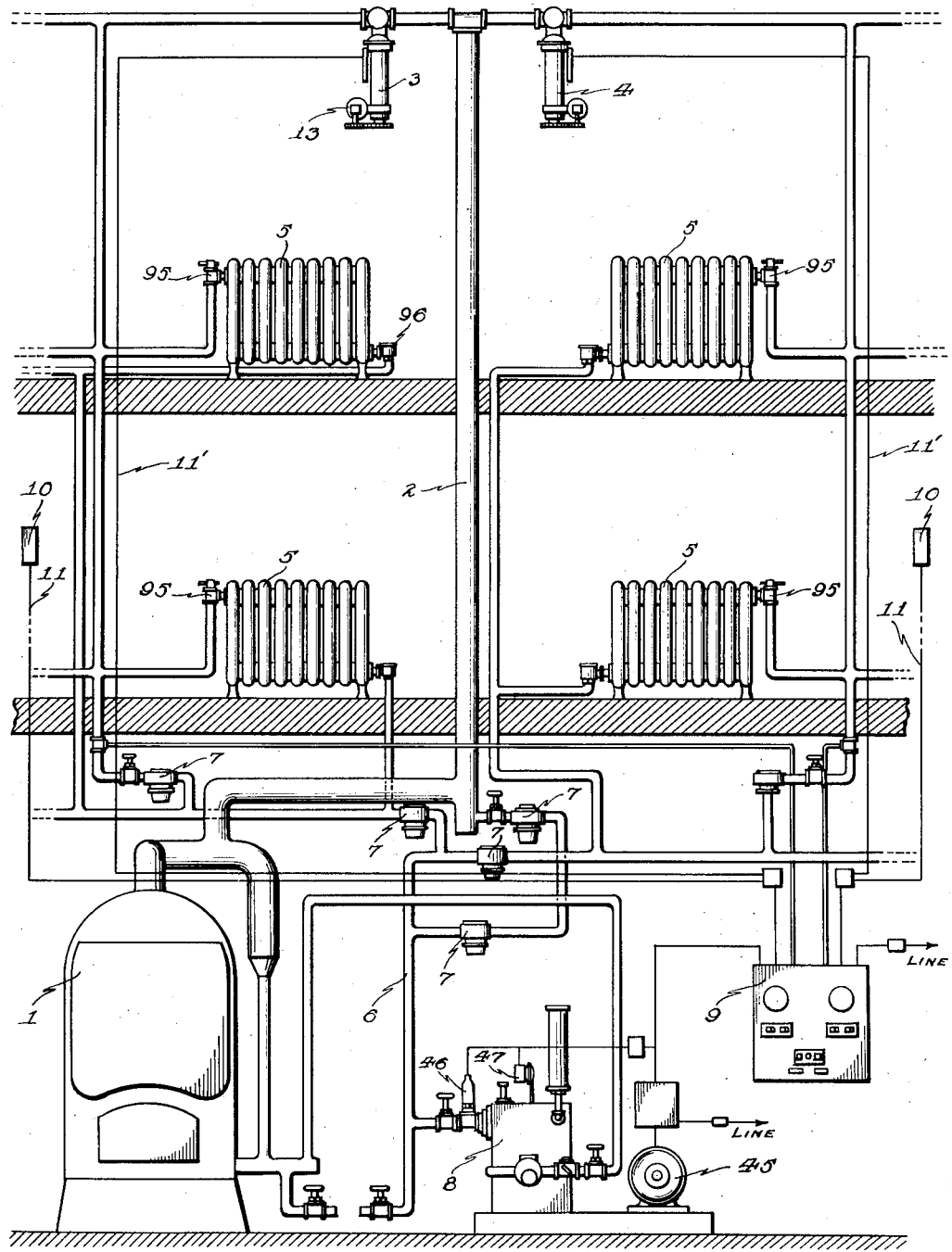
Figure 1 is a diagram showing, with a heating plant, two of the heated zones with conduit connections, radiators and the various control devices for regulating the steam circulation in the zones.

In Fig. 1 the steam heating plant is indicated at 1, the steam supply main at 2, regulating valves for different zones at 3 and 4, radiators at 5, a return main at 6, steam traps at 7 on all return conduits, a vacuum pump at 8, a control and indicating board at 9 and thermostatic devices at 10. The latter are shown having wiring connections 11 leading to control board 9 and through it by the conduits 11' to the motor driven regulators 3 and 4.

Figure 2:
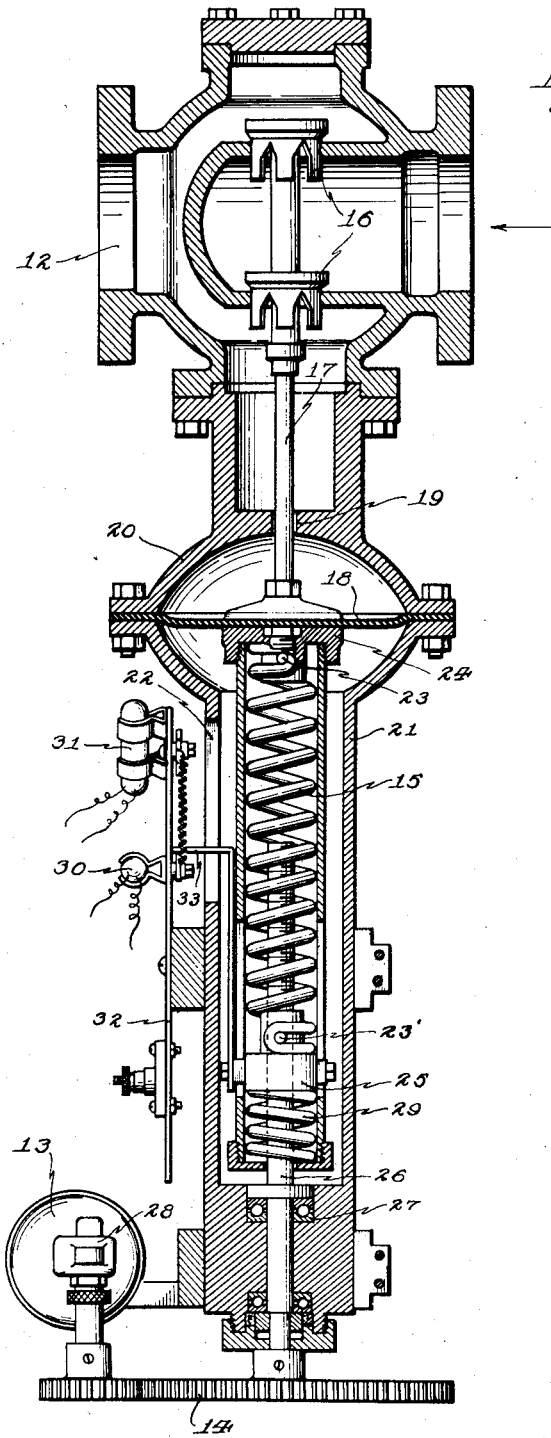
Fig. 2 is an enlarged detail in vertical section of an electrically operated regulating valve as used for controlling the steam flow to a zone or heated area.

One of the steam supply regulators is illustrated in Fig. 2 and consists of a diaphragm valve construction which is subject for operation to pressure conditions on the low pressure side 12 of the valve and the operation of an electric motor 13, which through the gearing 14 and connections with a spring 15, serves to place the spring under tension or compression.

The valves 16 are carried by a stem 17 which is attached to a diaphragm 18.

The pressure on the low pressure side 12 of the valve is communicated to the upper surface of the diaphragm through the opening 19 in the diaphragm housing 20. The lower face of the diaphragm is subject to atmospheric pressure because the spring housing 21 is open at 22. The spring is attached at its upper end through pin 23 with the diaphragm clamp 24 and at its lower end is attached by pin 23' to a nut 25 which has threaded engagement with the shaft 26. The shaft has bearings 27 in the spring housing and is driven by the gearing 14, through a worm gearing in casing 28 by the motor 13. The motor is reversible for rotating the shaft in either direction for the purposes of adding tension or compression to the spring. When the valves are seated the motor action is cushioned by the spring 29 beneath nut 25 at which time the motor circuit is opened by the tilting of mercury switch 30. When the valves are fully opened the motor circuit is opened by the tilting of switch 31. These switches are pivoted on a support 32 attached to the spring housing 21, and are oscillated on their pivots by the movable arm 33 carried by nut 25.

The circuits for motors 13 are under control, for forward or reverse operation of motors, of zone thermostats 10.

Figure 3:
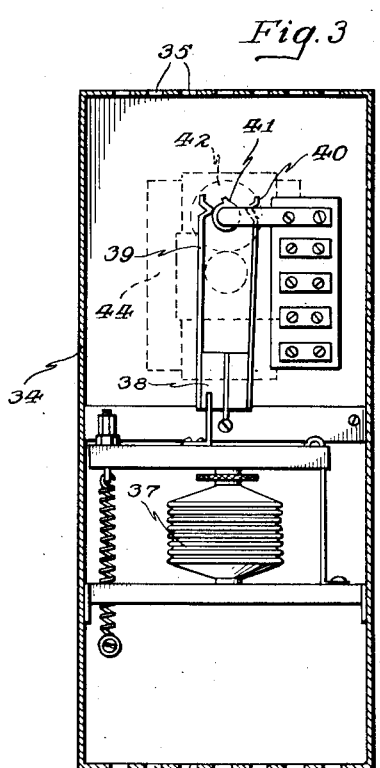
Fig. 3 is a face view with the casing in section of an infiltration thermostat which controls the operation of the motor for the regulating valve.

The zone thermostats as illustrated in Figs. 3 and 4 have casings 34 with openings 35 and 36 at the top and bottom so as to be subject to the temperature of air flowing along the walls to which the thermostats are attached. The expansion element 37 for each thermostat operates a tilting double contactor 38 having the contact arms 39 and 40 located for coaction with a central rotated contact 41, which is slowly and continuously driven through the gearing 42 by a small synchronous motor 44. Contact elements 39 and 40 as illustrated in Fig. 4 have separate connections to motor 13 for controlling its direction of motion.

The wiring arrangement leads to all control devices of the system including motor 45 for the vacuum pump 8 and a controller 46 for the pump, pump regulator 47 and the vacuum pump starter 48. The regulator and starter are of standard construction, being control devices now on the market and commonly used for the vacuum pumps of steam heating systems. The controller 46 is described in a copending application for patent on Selective controller, Serial No. 14,203 by Alfred F. Browne. It includes an expansion element 92, Fig. 5, subject for action to the temperature of a surrounding medium, and also by the pressure of that medium.

In the wiring diagram the current supply lines for the vacuum pump are indicated at 49 and the line wires for supplying energy to the electric control devices of the system are indicated at 50, and lead to the service switch 51 on the main control panel 9. A bus bar arrangement 52 is shown on the panel as connected to pairs of leads 53 and 53' for the different zones of the heating system. The wiring for one zone only is illustrated.

Switch 54 is made use of to place its respective zone under either automatic or manual control. Automatic control is had by placing the switch in the left hand position as shown in Fig. 5, which allows the line current to flow to the rotating contactor 41 of a thermostat 10. The current also flows to the thermostat motor 44 through the branch wire 55. The return connection for the thermostat motor is indicated at 56. Upon a decrease of the zone temperature to a predetermined point of setting of the thermostat the contactor 41 engages the contact arm 40 of the thermostat and allows the current to flow along conductor 57 to the mercury switch 31 and from there to motor 13 through conductor 57'. During the interval that the circuit is closed through contacts 41 and 44 the motor is driven in a direction to rotate screw 26, Fig. 2, as required for adding compression to spring 15 and thus urging the valves 16 away from their seats. The common return conductor 58 for the motor is connected to conductor 59 leading back to the line through branch 60.

In case there is an increase in temperature in the heated zone such as to cause the thermostat 37 to swing contact 40 out of the path of the rotating contact 41 and to swing the contact 39 into the path of the rotating contact the current is permitted to flow along the conductor 61 to the conductor 62 leading to the right hand contacts in mercury switch 30 and from thence to the motor 13 through conductor 63. This results in a reverse operation of the motor and the decrease of the compression of spring 15 or the tensioning thereof as screw 26 is then rotated in a direction to draw the nut 25 downwardly.

The central rotating contact 41 of the thermostat in this manner causes successive impulses to be imparted to the motor 13 in one direction or the other.

When the valves 16 reach their fully open position the circuit of motor 13 is opened by arm 33, Fig. 2, engaging and rocking the mercury switch 31 to its open position and when the valves 16 are fully seated arm 33 engages and tilts mercury switch 30 so as to open the circuit of the contacts at the right hand end of the bulb and to close the circuit at the contacts 64 at the left hand end of the bulb. Then the coil 65 Fig. 5 becomes energized and opens switch 66 which controls the circuit of vacuum pump motor 45. The circuit of coil 65 includes conductor 67 leading to one side of line 50, conductor 68 leading to the contacts 64 and conductors 69, 59 and 60 leading to the opposite side of line 50.

Each zone equipment in this manner controls the vacuum pump so as to permit it to operate only when there is an inflow of steam to radiators of one of the zones.

Each thermostat may be shunted out of operation for the purpose of allowing for manual control of the zone regulator motor 13, by rocking switch 54 to the right, Fig. 5. Then by means of switch 54' the current may be caused to flow to either conductor 57 or conductor 61. In this manner the motor 13 may be driven forwardly or reversely to cause an increase or decrease in temperature in the heated zone independently of the action of the thermostat.

The controlling means for the vacuum pump motor 45, in addition to switch 84, include the vacuum pump starter 48 which is a standard switching unit customarily employed for connecting the motor 45 with line wires 49.

The starter includes a switch 71 and overload relays 72. The motor switch 71 is dependent for operation upon the action of coil 73.

Current for operating with coil 73 flows from the line through conductor 74, switch 75, coil 73, conductor 76 and back to one of the line wires through conductor 77 in case a switch 78 is placed on contact 79. This is done whenever it is desired to have continuous operation of the vacuum pump 45; but normally switch 78 is in contact at the point 80 so that conductor 77 is in circuit with conductor 81 which leads to automatic control means for the vacuum pump motor and including switch 66.

Conduit 81 is connected to switch 66 through conductor 82. A conductor 83 leads from switch 66 to a switch 84 operated by a transformer relay 85. This switch is normally closed and the current is allowed to pass along conductor 86 to another normally closed switch 87 in the vacuum regulator 47. Conductor 88 connects switch 87 with conductor 76 leading to coil 73 and from there the circuit is completed back to the power line through switch 75 and conductor 74.

Connected across the terminals of switch 66 is a branch circuit for a pilot light 89 under the control of a manually operated switch 90 and for the purpose of indicating whether or not the vacuum pump is in operation.

The vacuum pump normally operates whenever steam is admitted to the heating equipment of a zone for at such times contacts 64 of mercury switch 30 are open. When the valves 16 are closed and there is no flow of steam, the contact 64 is closed and coil 65 becomes energized and the pump circuit is opened at the switch 66. However, this circuit may also be opened even though the switch 66 is closed in case the vacuum exceeds a predetermined amount or the temperature in the return mains is high enough to reflash the condensate into steam.

If the required vacuum is exceeded, the regulator 47 operates to open the switch 87. This regulator includes a pressure responsive element 91 for operating the switch. Also the circuit may be open at the selective controller 46 which includes a pressure temperature-responsive element 92 which is subject to the pressure and the temperature in the return mains and operates a mercury switch 93 which controls the opening and closing of the circuit for the secondary coil 94 of transformer relay 85.

Figure 6:
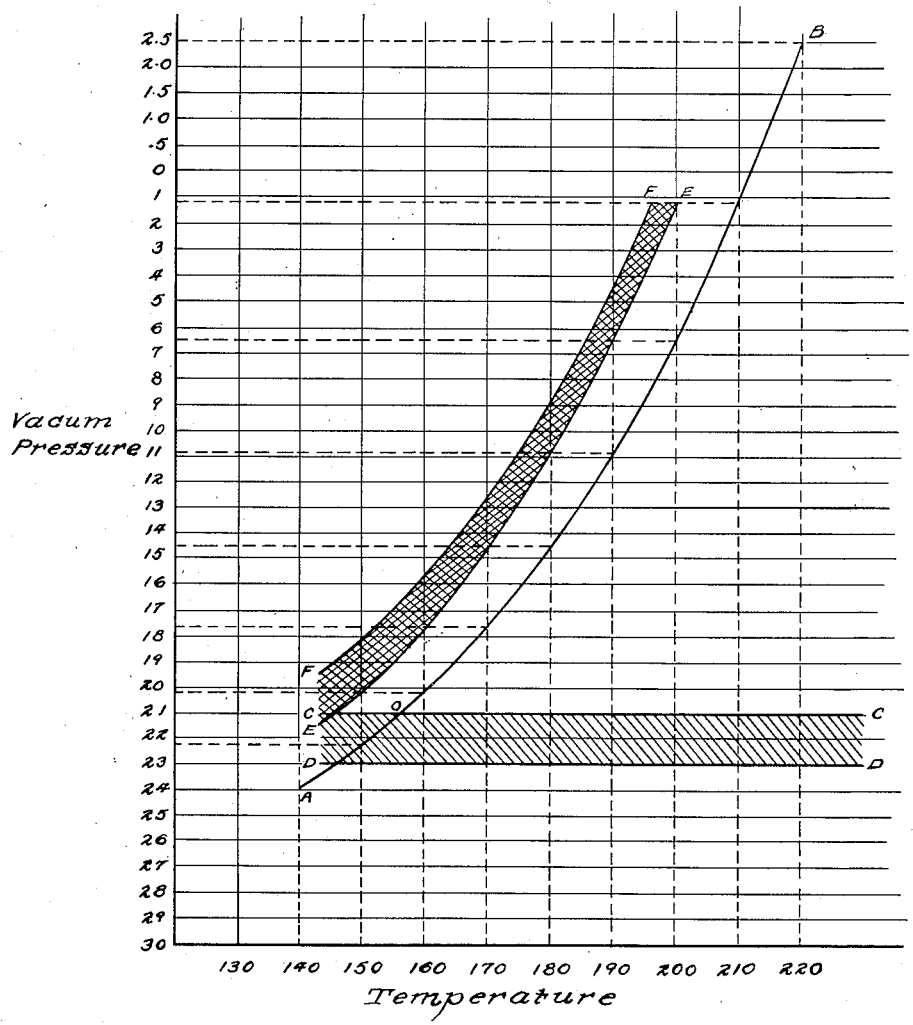
Fig. 6 is a performance chart for contrasting the operation of the improved equipment with reference to standard means for controlling vacuum or pressure conditions in the return mains.

The control of the vacuum pump is illustrated by the example charted in Fig. 6, wherein the left hand row of vertical figures indicate vacuum conditions below the zero point and pressure above the zero point. The lower horizontal figures are for temperature.

Curve A—B indicates the temperatures of vaporization over the range of operating pressures below and above atmosphere.

Lines C—C and D—D indicate the operating range of the standard vacuum pump regulator set for an operating range of between 21 and 23 inches of vacuum.

Curves E—E and F—F indicate the upper limit of the operating range of the controller 46, Fig. 5, with its cut-off point set 10° F. below the vaporization temperature. E—E indicates the cut-off point of the vacuum pump when operating under the controller 46 and F—F the cut-in point of the vacuum pump under controller operation, when the temperature of the return at the controller is that indicated by the curve A—B.

In operating without the controller, with a return temperature of approximately 150° F. the vacuum pump will operate between 21 and 23 inches but if the return line temperature rises to the temperature indicated at point 0 which is the intersection of the vaporization curve A—B and the cut-in point of the vacuum pump regulator, the vacuum pump will operate continuously and any increase in the vacuum above 21 inches will cause condensate to flash into steam. With the controller 46 in the line, under this condition the vacuum pump regulator is inoperative and the controller is in control of the pump, stopping same at 18½ inches of vacuum and starting same at 16¾ inches and preventing any re-evaporation and racing of the pump.

In the operation of this steam heating system, steam from a source 1 passes along the steam main 2 to the different regulators 3 and 4 for controlling the steam input to different heated zones.

Each of these regulators as previously explained operates as an automatic pressure reducing valve according to the pressure on the low side of the valve, while at the same time being automatically adjustable in opening and closing directions by reversing motors under the control of zone thermostats which are preferably located at some point in the zone remote from the source of heat. The regulating valves slowly move in one direction or the other, according to pressure changes and also according to increments in motion intermittently imparted thereto from their motors through springs according to the action of the driven thermostats. From the regulating valves, the steam passes at reduced pressure through supply mains, or risers, to the radiators through the customary hand-operated control valves 95.

At the outlet of each radiator are the customary thermostatically operated steam traps 96 which function as usual to permit all condensate and accumulated air to pass into a system of return risers and mains which are connected through the double trap arrangement 7 with the automatic electrically operated vacuum pump. The vacuum pump serves two functions: first, to create a vacuum and second, to discharge all air to the atmosphere while the condensate is discharged to the boiler or hot well.

The pump is under the control of the vacuum regulator 47 which has the function of holding the vacuum to some set limit such as between twenty-two to twenty-four inches. The pump also has the usual float control for maintaining condensation at the proper level in the receiver of the pump. The vacuum regulator and the float control operate independently of each other.

The automatic pressure reducing and control valves operated by motors 13 automatically throttle the flow of steam so that the pressure on the radiator side of the control valve cannot exceed a certain maximum for which the valve is set. However the valve is also operated and urged toward its fully open or closed positions by the motor which compresses or tensions the valve operating spring, according to forward or reverse impulses which it receives under the control of an infiltration type of thermostat. Thus, if the temperature in the vicinity of the thermostat rises above a certain point the steam supply to the radiators is throttled regardless of the pressure at the outlet side of the control valve. Likewise a drop in temperature at the thermostat below a certain point results in an opening movement of the valve so as to admit more steam to the radiators.

The control board 9, Fig. 1, illustrates connections between line conductors and one zone of a building which may be divided into several sections or zones, each with its own control valve and thermostat. The control board has the same number of panels as there are zones in the building, and has the customary pressure indicators for showing the pressure of the steam in the different zones, so that it is possible for the operator to tell from the control board the condition of operation or pressure in each particular zone or section. The pressure may vary from above atmosphere to from twenty to twenty-one inches of vacuum depending upon outside weather conditions. Also by means of switches mounted on the control board, it is possible for the operator to change any zone from thermostatic control to manual control.

When first starting the operation of the system with steam on the inlet side of the control valve, the electric circuits, for the motor operating this valve and for the infiltration thermostat and for the vacuum pump, are closed so that the control valve will start to admit steam to the system, and the vacuum pump creates a necessary reduction in pressure in the return mains. At this time the thermostatic traps are all open and there will be no material difference in pressure between the supply and return mains, the vacuum created by the vacuum pump extending throughout the system, except for the line friction and the throttling effect of valves 16. When the vacuum reaches the value determined by the setting of the vacuum pump regulator the pump is stopped and will not be in operation again until the vacuum has dropped to the cut-in point for which the regulator has been set.

The vacuum pump at all times operates between these two limits but may be stopped independently of the pressure operated regulator by means of the action of the control 46 which is responsive to the combined pressure and temperature conditions in the return mains.

Assuming that the heating system has been operating on a low night thermostat, and that it is now put in control of a high day thermostat, the automatic regulating valves will open further, and admit more steam to the system. The valves may go to wide open positions or to intermediate positions, according to the action of the thermostats.

The thermostats for the controlling valves are preferably located near the ends of the zones and the valve motors will vary the loading on the controlling springs of the valves according to changes in temperature in the vicinity of the thermostats. The valves open and close more or less upon any change in steam demand and at the same time serve as standard pressure reducing valves. When the entire system is filled with steam, and all the thermostatic traps are functioning the control valves float in a manner closely approximating changes in outdoor temperature, or due to air circulation through the building, being given increments of motion toward opening or closing positions because of the action of the controlling infiltration thermostats.

The emission of heat from the radiators is thus varied to balance the heat loss from the building. The operating range of pressures may be from above atmospheric to a sub-atmospheric pressure of twenty inches to twenty-two inches. When the control valves are in the position where the emission of heat from the radiators balances the heat loss from the building, the valve will float at this position until there is a change in the demand for more or less heat. The infiltration thermostats are responsive to inside and outside temperature, sun and wind conditions, and in turn effect a change in the position of the control valves.

This system operates with a varying controlled differential between the supply and return piping. It is desirable to have the maximum possible differential between the controlled supply pressure and the vacuum in the return conduits, but it is also desirable to control the vacuum pump so that the maximum vacuum in the return main will always be less than the flash point of the condensate at the vacuum pump. Hence a combination pressure and temperature vacuum controlling means is employed. It is not only affected by the pressure in the return main but also by the temperature of the condensate and non-condensible gases in the return main, at or close to the vacuum pump. This control means does not have any cross connection with the supply main, and functions solely according to temperature and pressure in the return main.

The double trapping arrangement shown in Fig. 1 where there is a plurality of traps set in succession, is for the purpose of bringing about uniformity in the temperature of the return water reaching the pump from a plurality of zones.

We claim:

1. In a steam heating system a source of steam supply, radiation means, supply and return conduits between said source and radiation means, a regulating valve in the supply conduit for controlling the flow of steam to the radiation means, said regulating valve being constructed to be subject in operation to the pressure on the low pressure side of said valve independently of the pressure on the high pressure side of the valve, a spring for acting upon said valve, a motor for tensioning and compressing said spring, a circuit for said motor and a thermostat in the motor circuit responsive to effect of the opening and closing of said valve and arranged to control said circuit to cause the motor to progressively compress or tension said spring according to temperature variations to which the thermostat is subject.

2. In a steam heating system a source of steam supply, radiation means, supply and return conduits between said source of supply and radiation means, a regulating valve in said supply conduit for controlling the flow of steam to said radiation means, said regulating valve being constructed to be subject in operation to the pressure on the low pressure side of said valve, a spring for acting upon said valve, a motor for tensioning or compressing said spring, a circuit for said motor and a thermostat in the motor circuit responsive to effect of the opening and closing of said valve and arranged to control said circuit to cause the motor to progressively compress or tension said spring according to temperature variations to which the thermostat is subject, a vacuum producer and a return conduit, traps in the return conduit between said radiation means and vacuum producer and means for controlling the operation of said vacuum producer, said means being subject to the temperature of the fluid in said return conduit.

3. In a steam heating system a source of steam supply, comprising a plurality of separate radiation systems, supply and return conduits between said source of steam supply and radiation systems, a vacuum producer connected to said return conduits, a succession of steam traps in said return conduits between the radiation systems and the vacuum producer, and a return conduit temperature responsive control means for said vacuum producer.

4. In a steam heating system a source of steam supply, radiation means, supply and return conduits between said source of steam supply and radiation means, a regulating valve in the supply conduit for controlling the flow of steam to said radiation means, a diaphragm motor for operating said regulating valve, means for communicating the steam pressure on the outlet side only of said valve with said diaphragm motor, means for additionally imparting progressively incremental movements to said diaphragm motor, and a thermostat responsive to the effect of the opening and closing of said valve for controlling the operation of said last mentioned means.

5. In a steam heating system a source of steam supply, a plurality of separate radiation systems, feed pipes leading from said source to said radiator systems, a regulation valve for each of said feed pipes for controlling said different radiation systems, thermostatic means responsive to the effect of the opening and closing of said valve for controlling said regulators, a common return conduit connected with said radiation systems and the source of steam supply, a vacuum pump in said return conduit, and control means for said vacuum pump for causing the operation of said pump whenever the regulators admit steam to one of said radiation systems regardless of absence of flow into the remaining radiation systems and for stopping the operation of said pump when there is no flow of steam to any of said radiation systems.

6. In a steam heating system a source of steam supply, a plurality of separate radiation systems, feed pipes leading from said source to said radiation systems, a regulation valve for each of said feed pipes for controlling said different radiation systems, thermostatic means responsive to the effect of the opening and closing of said valve for controlling said regulators, a common return conduit connected with said radiation systems and the source of steam supply, a vacuum pump in said return conduit, means controlled by said regulators for causing the operation of said pump whenever the regulators admit steam to one of said radiation systems regardless of absence of flow in the remaining systems and for stopping the operation of said pump when there is no flow of steam to any of said radiation systems, and temperature responsive means in said return conduit for additionally controlling the operation of said vacuum pump.

7. In a steam heating system a source of steam supply, radiation means, supply and return conduits between said source of supply and radiation means, a regulating valve in said supply conduit for controlling the flow of steam to said radiation means, said regulating valve being constructed to be subject in operation to the pressure on the low pressure side of said valve, a spring for acting upon said valve, a motor for tensioning or compressing said spring, a circuit for said motor and a thermostat responsive to the effect of the opening and closing of said valve in the motor circuit arranged to control said circuit to cause the motor to progressively compress or tension said spring according to temperature variations to which the thermostat is subject, a vacuum producer and a return conduit, traps in the return conduit between said radiation means and vacuum producer and means for controlling the operation of said vacuum producer, said means being subject to the temperature and pressure of the fluid in said return conduit.

8. In a steam heating system a source of steam supply, a plurality of separate radiation systems, feed pipes leading from said source to said radiation systems, a regulating valve for each of said feed pipes for controlling said different radiation systems, thermostatic means responsive to the effect of the opening and closing of said valve for controlling said regulators, a common return conduit connected with said radiation systems and the source of steam supply, a vacuum pump in said return conduit, means controlled by said regulators for causing the operation of said pump whenever the regulators admit steam to one of said radiation systems regardless of absence of flow in the remaining systems and for stopping the operation of said pump when there is no flow of steam to any of said radiation systems, and a combined temperature and pressure responsive means in said return conduit for additionally controlling the operation of said vacuum pump.

9. In a steam heating system a source of steam supply, a plurality of separate radiation systems, feed pipes leading from said source to said radiation systems, means for regulating the flow in each of said feed pipes for individual control of said different radiation systems, a return conduit for each of said radiation systems, a common return conduit connected with said return conduits for the radiation systems, a vacuum pump connected to said common return conduit, and traps arranged in series in the common return conduit and the individual return conduits for said separate radiation systems for the purpose of insuring uniformity in the temperature of the condensate reaching said pump from a plurality of radiation systems.

RICHARD W. LEUTWILER.
WILLIAM EICHHOLZ.